US012698936B2

(12) United States Patent
Chen

(10) Patent No.: US 12,698,936 B2
(45) Date of Patent: Aug. 4, 2026

(54) MEDICAL PROTECTIVE CLOTHING AND DISINFECTION EQUIPMENT FOR AUTOMATICALLY CLEANING UP SWEAT

(71) Applicant: Guangdong Institute of advanced science and technology, Dongguan (CN)

(72) Inventor: GuiLin Chen, Dongguan (CN)

(73) Assignee: Guangdong Institute of advanced science and technology, Dongguan (CN)

( * ) Notice: Subject to any disclaimer, the term of this patent is extended or adjusted under 35 U.S.C. 154(b) by 993 days.

(21) Appl. No.: 17/946,050

(22) Filed: Sep. 16, 2022

(65) Prior Publication Data

US 2023/0008690 A1 Jan. 12, 2023

(51) Int. Cl.

| | |
|---|---|
| ***B60S 3/04*** | (2006.01) |
| ***A41D 13/12*** | (2006.01) |
| ***F26B 21/00*** | (2026.01) |
| ***F26B 21/50*** | (2026.01) |

(52) U.S. Cl.
CPC .......... *F26B 21/50* (2026.01); *A41D 13/1218* (2013.01); *F26B 21/001* (2013.01)

(58) Field of Classification Search
CPC ............................ F26B 21/004; F26B 21/001
USPC ............ 134/43, 167 R, 99.1; 34/72; 135/900
See application file for complete search history.

(56) References Cited

U.S. PATENT DOCUMENTS

| | | | |
|---|---|---|---|
| 2019/0030855 | A1 | 1/2019 | Anantharamaiah et al. |
| 2020/0070472 | A1 | 3/2020 | Anantharamaiah et al. |
| 2022/0049390 | A1 | 2/2022 | Huang |

FOREIGN PATENT DOCUMENTS

| | | | |
|---|---|---|---|
| CN | 112284107 A * | 1/2021 | ............ F26B 21/004 |

OTHER PUBLICATIONS

English translation of CN112284107 by PE2E Jun. 2, 2025.*

* cited by examiner

*Primary Examiner* — Deming Wan
(74) *Attorney, Agent, or Firm* — Hemisphere Law, PLLC

(57) ABSTRACT

The present disclosure discloses disinfection equipment for automatically cleaning up sweat. The disinfection equipment includes a supporting plate; one side of the supporting plate is fixedly connected with a vertical plate; one side of the vertical plate is fixedly connected with an air purifier; an upper end of one side of the supporting plate is connected with an inflation connection seat; and an upper side of the supporting plate is provided with a deflation connection seat.

6 Claims, 6 Drawing Sheets

MEDICAL PROTECTIVE CLOTHING AND DISINFECTION EQUIPMENT FOR AUTOMATICALLY CLEANING UP SWEAT

TECHNICAL FIELD

The present disclosure relates to the technical field of epidemic prevention devices, in particular, to medical protective clothing and disinfection equipment for automatically cleaning up sweat.

BACKGROUND

Preventive clothing is mostly one-piece or two-piece. The one-piece protective clothing integrates a hood, a coat and trousers, and has an opening on the front chest for easy wearing. It is usually sewn from special cloth, plastic cloth or paper of a special material. The existing protective clothing can prevent contamination, but it is not breathable. When working staff wears the protective clothing for a long time, there will be sweat in the protective clothing, which will soak the skin of the body; and the sweat cannot be discharged in time according to a need, thus seriously affecting the comfort level of wearing.

SUMMARY

The purpose of the present disclosure is to solve the defects in the prior art to provide medical protective clothing and disinfection equipment for automatically cleaning up sweat, so as to solve the problems in the prior art.

In order to achieve the foregoing purpose, the present disclosure adopts the following technical solution:

Disinfection equipment for automatically cleaning up sweat includes a supporting plate; one side of the supporting plate is fixedly connected with a vertical plate; one side of the vertical plate is fixedly connected with an air purifier; an upper end of one side of the supporting plate is connected with an inflation connection seat; and an upper side of the supporting plate is provided with a deflation connection seat.

Preferably, the inflation connection seat includes a sliding block; one side of the vertical plate is provided with a sliding chute; the sliding block is slidably connected in the sliding chute; upper ends of the sliding block and the sliding chute are fixedly connected with a suspension spring; one side of the sliding block is fixedly connected with an arc-shaped plate; a bottom of the arc-shaped plate is fixedly connected with an upper inflation nozzle; and an air outlet pipe of the air purifier is communicated with the upper inflation nozzle through a first hose.

Preferably, two ends of the arc-shaped plate are fixedly connected with handles respectively; two ends of the arc-shaped plate are fixedly connected with hanger plates respectively; one side of each hanger plate is fixedly connected with a hand inflation nozzle; and a second hose is connected between the hand inflation nozzle and the air outlet pipe of the air purifier.

Preferably, leg abutting nozzles are arranged on the supporting plate.

Preferably, the upper inflation nozzle, each hand inflation nozzle and each leg abutting nozzle have the same structures; the upper inflation nozzle includes a sleeve; a stepped hole is formed in the sleeve; one end of the stepped hole is conical; a small-diameter section of the stepped hole is slidably connected with a blocking pillar; a first spring is fixedly connected between the blocking pillar and the stepped hole; the blocking pillar is provided with a conical hole; a ventilation hole is formed in an inner wall of the conical hole; and the ventilation hole is communicated with an outer circular surface of the blocking pillar.

Preferably, the deflation connection seat includes a barrel; the barrel is fixedly connected to the supporting plate; the barrel is internally slidably connected with a piston plate; a supporting spring is arranged at bottoms of the piston plate and the barrel; an upper side of the piston plate is fixedly connected with a push rod; an upper end of the push rod is fixedly connected with a pedal; the leg abutting nozzle is fixedly connected to one side of the pedal; one side of a bottom of the barrel is fixedly connected with a deflation pipe; one end of the discharge pipe is fixedly connected with a flow division pipe; the flow division pipe is communicated with the leg abutting nozzle through a third hose; a middle part of the flow division pipe is fixedly connected with a discharge pipe; and an end socket of the discharge pipe is provided with a control valve and a drying box.

Medical protective clothing, which is inflated and discharges sweat using the above-mentioned disinfection equipment, includes a closed hood body; the head, the hands and the legs of the hood body are respectively fixedly connected with an abutting pipe; each abutting pipe includes a reference pipe; vent holes are formed in two sides of the reference pipe; the reference pipe is fixedly connected with the hood body; the reference pipe is internally slidably connected with a communicating pipe; a lower end of the communicating pipe is of a closed structure, and two sides are provided with abutting holes; the lower end of the communicating pipe and a bottom of the reference pipe are fixedly connected with reset springs; and the abutting holes can be aligned with the vent holes.

The present disclosure has the advantages that according to the medical protective clothing and the disinfection equipment for automatically cleaning up the sweat, working staff wearing the protective clothing stands on the supporting plate; the arc-shaped plate is pulled down to abut and connect the upper inflation nozzle to the protective clothing; the arc-shaped plate slides up and down to adapt to users with different heights, so that the generality is high; clean air is blown into the protective clothing in way of blowing air from the top and discharging air from the legs, so that sweat in the protective clothing is dried; part of the sweat slides off along an inner wall of the inflated hood body and is intensively discharged from the deflation connection seat, so that the sweat in the closed protective clothing can be discharged in time according to a need, thus relieving the discomfortableness in wearing of medical staff and maintaining the comfort level.

DETAILED DESCRIPTION OF THE EMBODIMENTS

Figure 1:
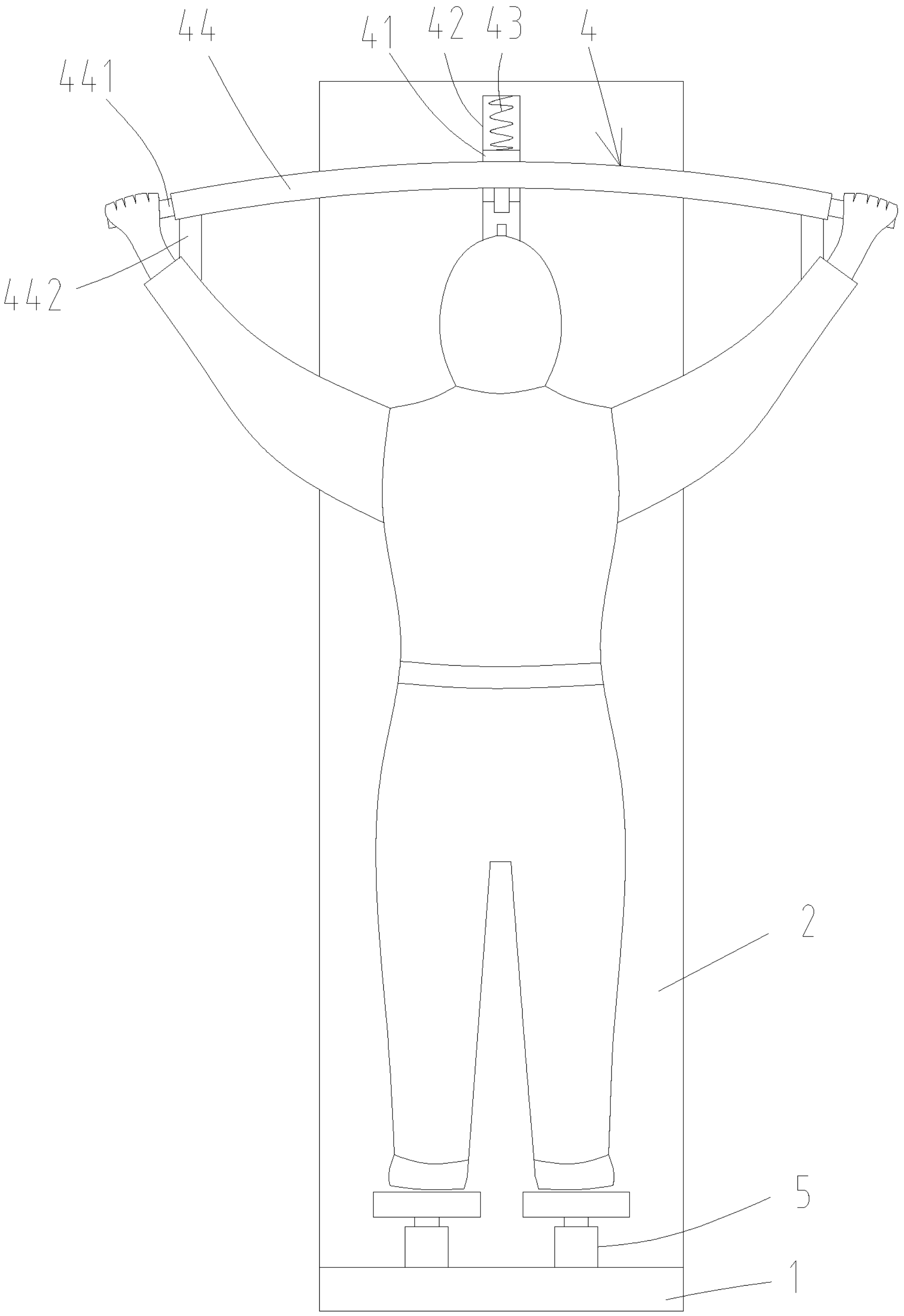
FIG. 1 is a schematic diagram of a basic structure of the present disclosure.
Figure 2:
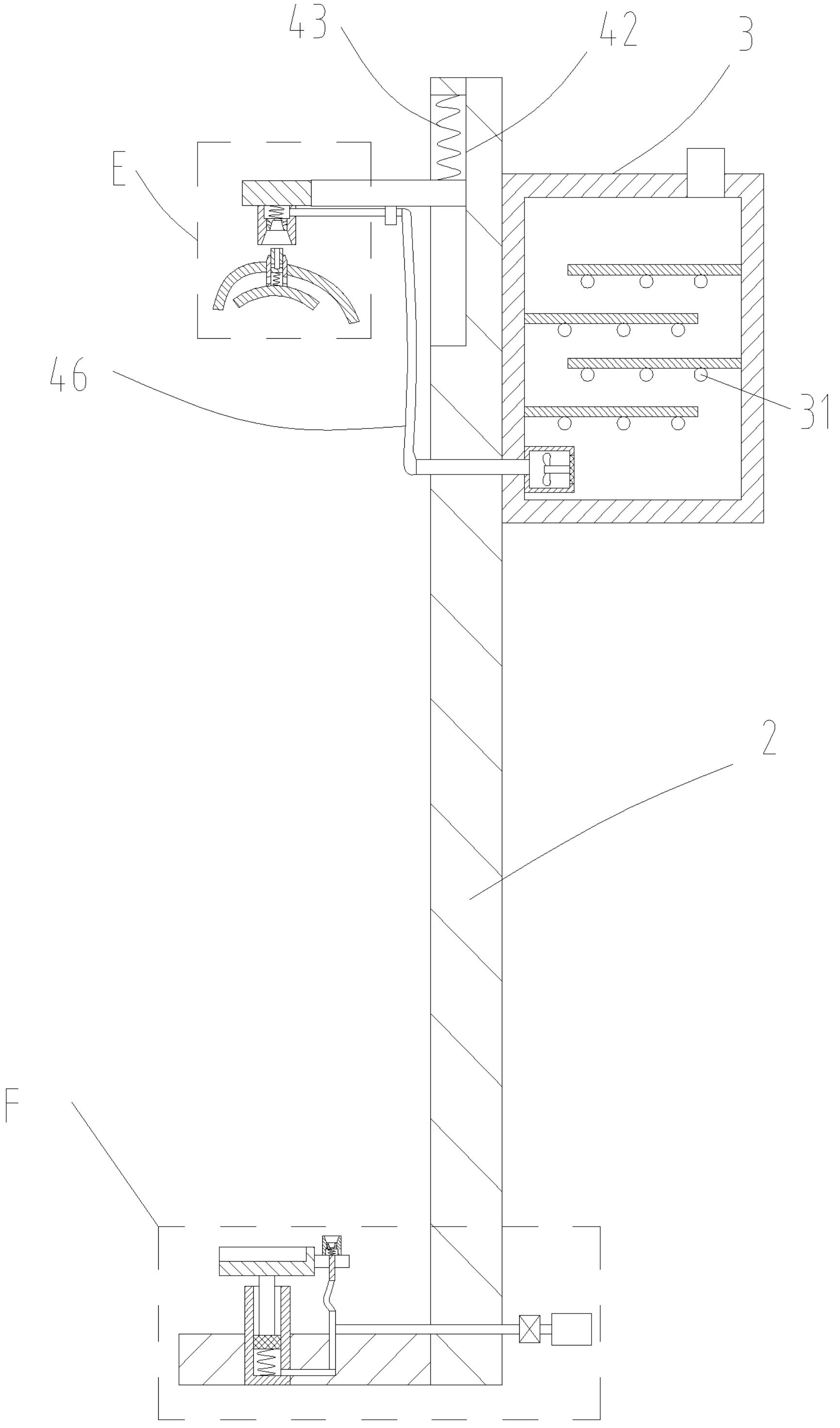
FIG. 2 is a side view of the present disclosure.
Figure 3:
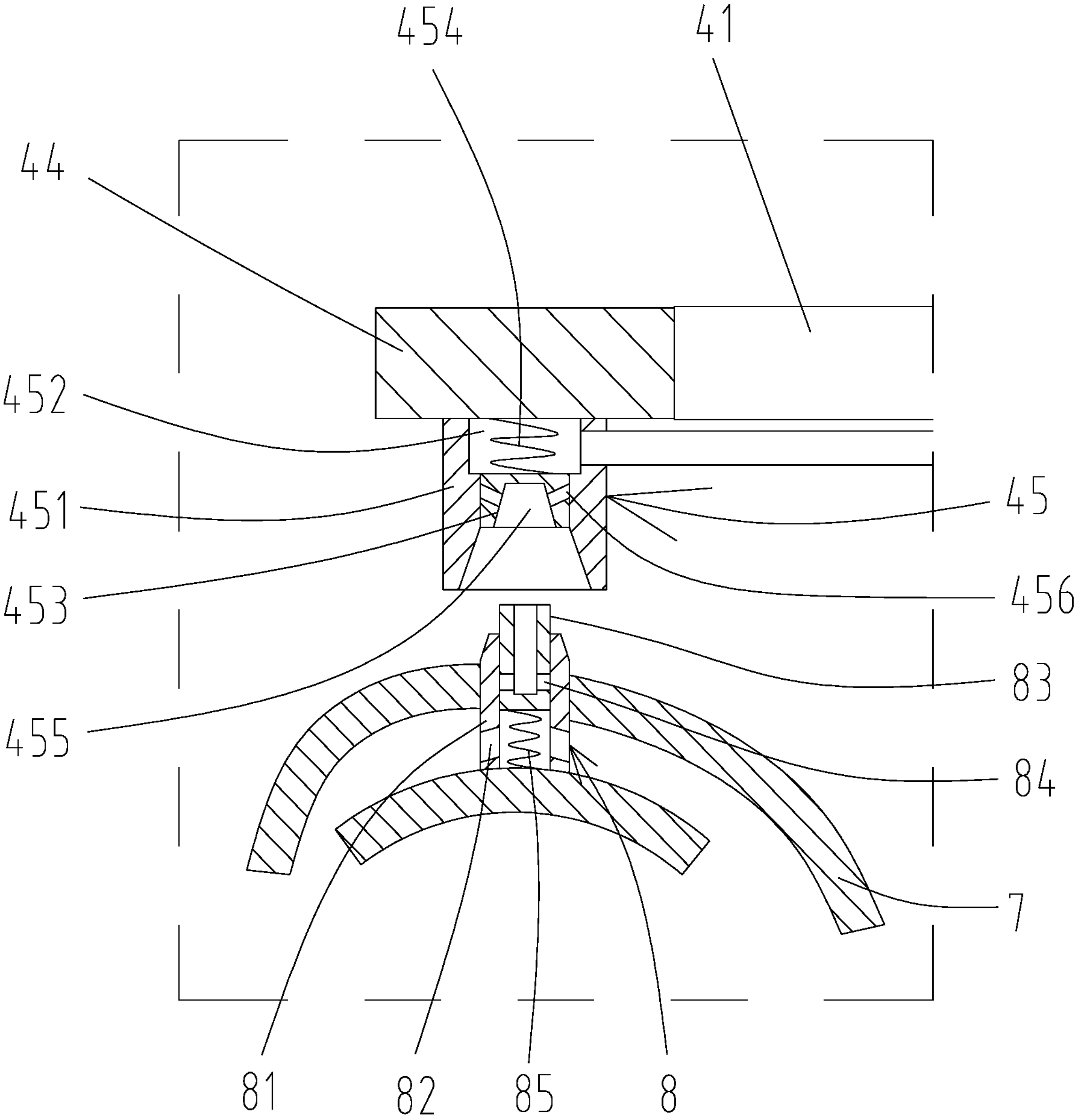
FIG. 3 is a partially enlarged diagram of the part E in FIG. 2.
Figure 4:
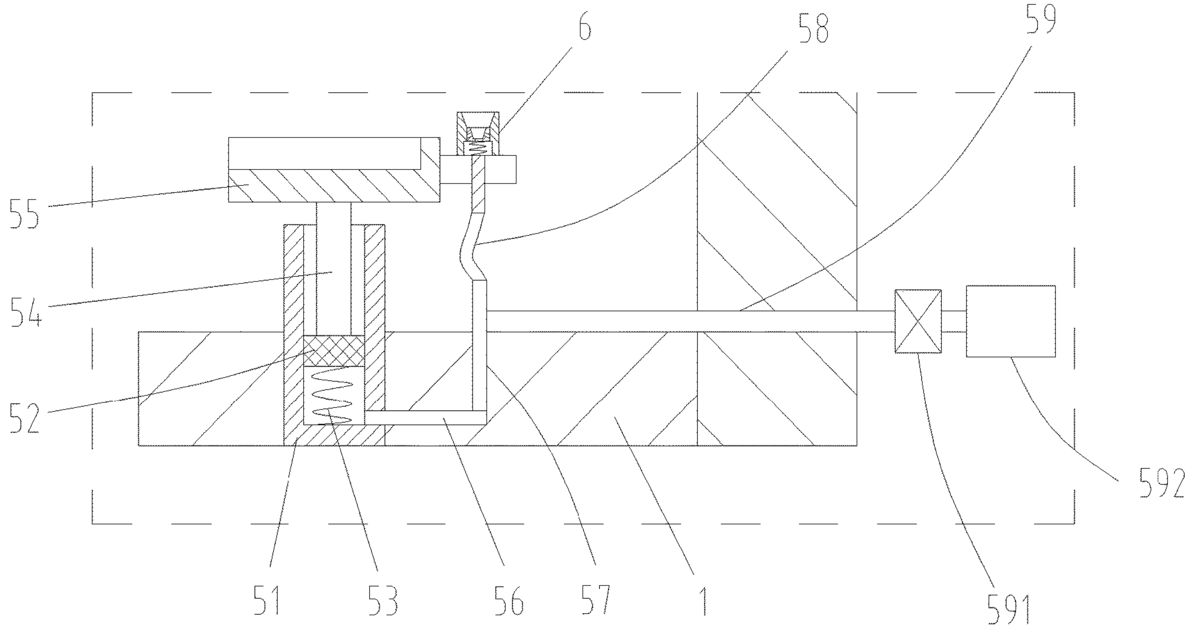
FIG. 4 is a partially enlarged diagram of the part F in FIG. 2.

In order to make the objectives, technical solutions and advantages of the present disclosure clearer, the present disclosure is further described below in detail with reference to accompanying drawings and embodiments. It should be understood that the specific embodiments described here are merely to explain the present disclosure, and not intended to limit the present disclosure.

As shown in FIGS. 1-6, the present disclosure provides disinfection equipment for automatically cleaning up sweat, including a supporting plate 1; one side of the supporting plate 1 is fixedly connected with a vertical plate 2; one side of the vertical plate 2 is fixedly connected with an air purifier 3; an air inlet of the air purifier 3 is provided with an air purification filter element; a plurality of partition plates are fixedly connected in the air purifier 3 in a spacing manner; the plurality of partition plates are distributed in a left and right dislocation manner; a bottom of each partition plate is fixedly connected with an ultraviolet lamp 31 to disinfect air introduced into protective clothing; an upper end of one side of the supporting plate 1 is slidably connected with an inflation connection seat 4; and an upper side of the supporting plate 1 is provided with a deflation connection seat 5.

The present disclosure further discloses medical protective clothing, including a closed hood body 7; the head, the hands and the legs of the hood body are respectively fixedly connected with an abutting pipe 8; each abutting pipe 8 includes a reference pipe 81; vent holes 82 are formed in two sides of the reference pipe 81; the reference pipe 81 is fixedly connected with the hood body 7; the reference pipe 81 is internally slidably connected with a communicating pipe 83; a lower end of the communicating pipe 83 is of a closed structure, and two sides are provided with abutting holes 84; the lower end of the communicating pipe 83 and a bottom of the reference pipe 81 are fixedly connected with reset springs 85; and the abutting holes 84 can be aligned with the vent holes 82, so that a passage can be formed.

Figure 5:
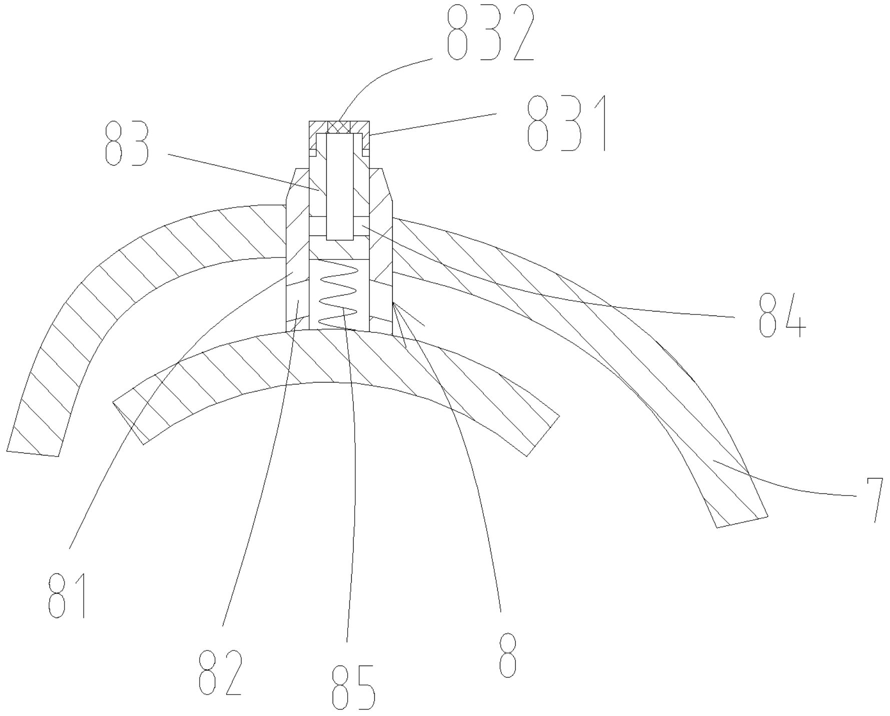
FIG. 5 is a schematic structural diagram of a communicating pipe.
Figure 6:
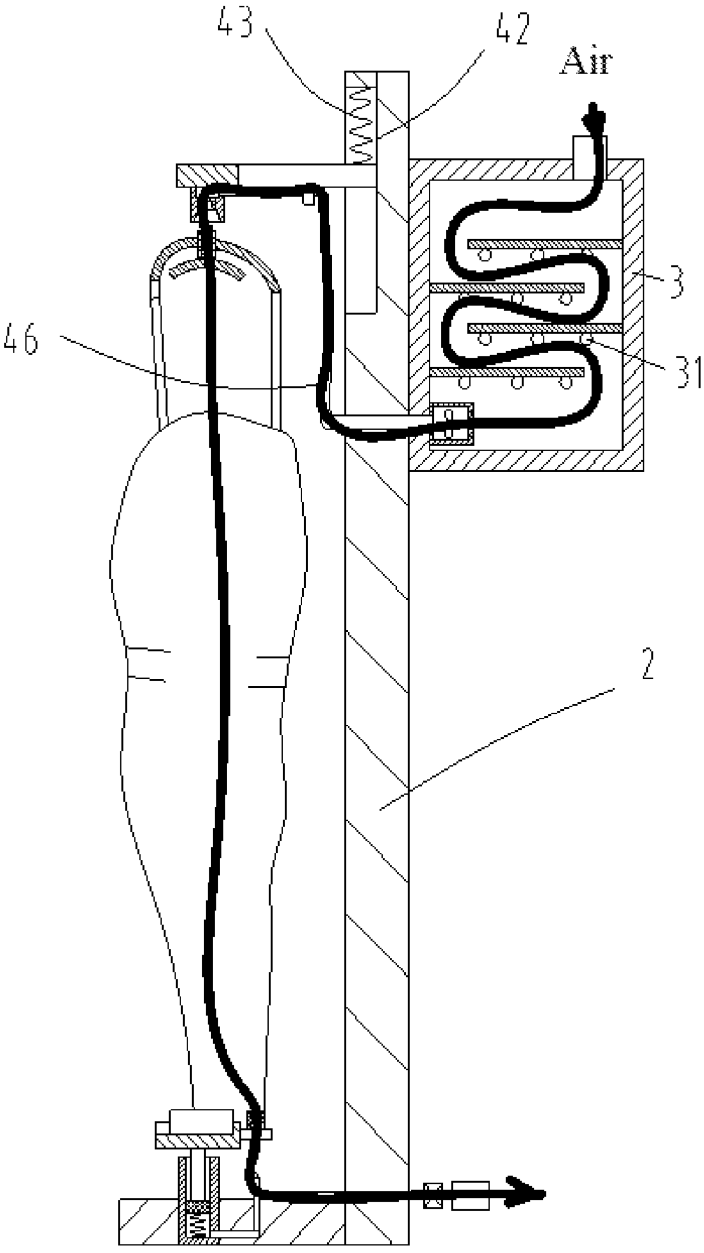
FIG. 6 is a working principle diagram of the present disclosure.

As shown in FIG. 5, an upper end of the communicating pipe 83 is in threaded connection with a protective cover 831; an excircle of the protective cover 831 is smaller than an inner hole of the reference pipe 81; the protective cover 831 is provided with a penetrating mounting hole; the mounting hole is internally fixedly connected with a filter sheet 832; the filter sheet 832 includes two layers of nonwoven cloth; a melt-blown cloth filter layer is arranged between the two layers of nonwoven cloth to further isolate viruses left in the air blown into the protective clothing from the outside.

The inflation connection seat 4 includes a sliding block 41; one side of the vertical plate 2 is provided with a sliding chute 42; the sliding block 41 is slidably connected in the sliding chute 42; upper ends of the sliding block 41 and the sliding chute 42 are fixedly connected with a suspension spring 43; one side of the sliding block 41 is fixedly connected with an arc-shaped plate 44; a bottom of the arc-shaped plate 44 is fixedly connected with an upper inflation nozzle 45; and an air outlet pipe of the air purifier 3 is communicated with the upper inflation nozzle 45 through a first hose 46.

Working staff wearing the protective clothing stands on the supporting plate 1; the arc-shaped plate 44 is pulled down to abut and connect the upper inflation nozzle 45 to the protective clothing; the arc-shaped plate 44 slides up and down to adapt to users with different heights, so that the generality is high; furthermore, the working staff puts the hands up, so that the entire protective clothing is propped up to avoid structures that prevent air from flowing, and it is convenient to blow out the sweat; moreover, clean air is blown into the protective clothing in way of blowing air from the top and discharging air from the legs, so that the sweat in the protective clothing is dried; part of the sweat slides off along an inner wall of the inflated hood body 7 and is intensively discharged from the deflation connection seat 5, so that the sweat in the closed protective clothing can be discharged in time according to a need, thus relieving the discomfortableness in wearing of medical staff and maintaining the comfort level.

Two ends of the arc-shaped plate 44 are fixedly connected with handles 441 respectively; two ends of the arc-shaped plate 44 are fixedly connected with hanger plates 442 respectively; one side of each hanger plate 442 is fixedly connected with a hand inflation nozzle; a second hose is connected between the hand inflation nozzle and the air outlet pipe of the air purifier 3; and leg abutting nozzles 6 are arranged on the supporting plate 1.

The upper inflation nozzle 45, each hand inflation nozzle and each leg abutting nozzle 6 have the same structures; the upper inflation nozzle 45 includes a sleeve 451; a stepped hole 452 is formed in the sleeve 451; one end of the stepped hole 452 is conical; a small-diameter section of the stepped hole 452 is slidably connected with a blocking pillar 453; a first spring 454 is fixedly connected between the blocking pillar 453 and the stepped hole 452; the blocking pillar 453 is provided with a conical hole 455; a ventilation hole 456 is formed in an inner wall of the conical hole 455; and the ventilation hole 456 is communicated with an outer circular surface of the blocking pillar 453.

The upper inflation nozzle 45, each hand inflation nozzle and each leg abutting nozzle 6 have the same structures, which all play a role of being abutted and communicated with the corresponding abutting pipes 8 and are all kept in a closed state after being separated, so that it is convenient to disinfect abutting ports and avoid air in an external polluted environment from entering the closed protective clothing; sealing rings are arranged on outer sides of the communicating pipe 83 and the blocking pillar 453; during abutting, the communicating pipe 83 and the blocking pillar 453 are relatively pressed, and the corresponding first spring 454 and reset spring 85 are both compressed; the abutting holes 84 and the vent holes 82 are aligned to form passages; when an outlet end of the ventilation hole 456 is not in contact with the hole wall of the stepped hole 452, a passage is formed; air purified by the air purifier 3 is blown into the protective clothing to blow the sweat to dry, and the sweat and water vapor are discharged; and therefore, the comfort level of wearing of a user can be changed in time.

The deflation connection seat 5 includes a barrel 51; the barrel 51 is fixedly connected to the supporting plate 1; the barrel 51 is internally slidably connected with a piston plate 52; a supporting spring 53 is arranged at bottoms of the piston plate 52 and the barrel 51; an upper side of the piston plate 52 is fixedly connected with a push rod 54; an upper end of the push rod 54 is fixedly connected with a pedal 55; the leg abutting nozzle 6 is fixedly connected to one side of the pedal 55; one side of a bottom of the barrel 51 is fixedly connected with a deflation pipe 56; one end of the discharge pipe 56 is fixedly connected with a flow division pipe 57; the flow division pipe 57 is communicated with the leg abutting nozzle 6 through a third hose 58; a middle part of the flow division pipe 57 is fixedly connected with a discharge pipe 59; an end socket of the discharge pipe 59 is provided with a control valve 591 and a drying box 592; and the drying box 592 dries the discharged wet air.

A user stands individually on the pedal 55 on each leg, and each leg abutting nozzle 6 and the corresponding abutting pipe 8 form a connection passage; the piston plate 52 is pressed under the action of the body weight of the user; the control valve 591 is first closed; air in the barrel 51 is compressed into the protective clothing; the protective cloth swells with the air, and a cavity is formed between the inside of the protective clothing and the body of the user; the inflation connection seat 4 above blows air to blow out the sweat and blow clothes of the user to dry; after the sweat is blown to dry, the control valve 591 is opened; and the user first removes the inflation connection seat 4, then takes away one leg slowly, puts it on the ground, and takes away the other leg. In this way, the inner cavity of the barrel 51 is reset to re-suck the air for making the protective clothing swell into the barrel 51, so that the protective clothing is restored to a state of being fitted to the body of the user, without affecting operation actions of the user.

Although the embodiments of the present disclosure have been shown and described, it will be understood by those of ordinary skill in the art that various changes, modifications, substitutions, and variations can be made to these embodiments without departing from the principle and spirit of the present disclosure. The scope of the present disclosure is defined by the attached claims and their equivalents.

What is claimed is:

1. Disinfection equipment for automatically cleaning up sweat, the disinfection equipment comprising a supporting plate (1), wherein one side of the supporting plate (1) is fixedly connected with a vertical plate (2); one side of the vertical plate (2) is fixedly connected with an air purifier (3); an upper end of one side of the vertical plate (2) is connected with an inflation connection seat (4), the supporting plate (1) is attached to the vertical plate (2) at the lower end; and an upper side of the supporting plate (1) is provided with a deflation connection seat (5);

wherein the inflation connection seat (4) comprises a sliding block (41); one side of the vertical plate (2) is provided with a sliding chute (42); the sliding block (41) is slidably connected in the sliding chute (42); upper ends of the sliding block (41) and the sliding chute (42) are fixedly connected with a suspension spring (43); one side of the sliding block (41) is fixedly connected with an arc-shaped plate (44); a bottom of the arc-shaped plate (44) is fixedly connected with an upper inflation nozzle (45); and an air outlet pipe of the air purifier (3) is communicated with the upper inflation nozzle (45) through a first hose (46).

2. The disinfection equipment for automatically cleaning up the sweat according to claim 1, wherein two ends of the arc-shaped plate (44) are fixedly connected with handles (441) respectively; two ends of the arc-shaped plate (44) are fixedly connected with hanger plates (442) respectively; one side of each of the hanger plates (442) is fixedly connected with a hand inflation nozzle; and a second hose is connected between the hand inflation nozzle and the air outlet pipe of the air purifier (3).

3. The disinfection equipment for automatically cleaning up the sweat according to claim 2, wherein leg abutting nozzles (6) are arranged on the supporting plate (1).

4. The disinfection equipment for automatically cleaning up the sweat according to claim 3, wherein the upper inflation nozzle (45), each of the hand inflation nozzles and each of the leg abutting nozzles (6) have the same structures; the upper inflation nozzle (45) comprises a sleeve (451); a stepped hole (452) is formed in the sleeve (451); one end of the stepped hole (452) is conical; a small-diameter section of the stepped hole (452) is slidably connected with a blocking pillar (453); a first spring (454) is fixedly connected between the blocking pillar (453) and the stepped hole (452); the blocking pillar (453) is provided with a conical hole (455); a ventilation hole (456) is formed in an inner wall of the conical hole (455); and the ventilation hole (456) is communicated with an outer circular surface of the blocking pillar (453).

5. The disinfection equipment for automatically cleaning up the sweat according to claim 4, wherein the deflation connection seat (5) comprises a barrel (51); the barrel (51) is fixedly connected to the supporting plate (1); the barrel (51) is internally slidably connected with a piston plate (52); a supporting spring (53) is arranged at bottoms of the piston plate (52) and the barrel (51); an upper side of the piston plate (52) is fixedly connected with a push rod (54); an upper end of the push rod (54) is fixedly connected with a pedal (55); the leg abutting nozzle (6) is fixedly connected to one side of the pedal (55); one side of a bottom of the barrel (51) is fixedly connected with a deflation pipe (56); one end of the discharge pipe (56) is fixedly connected with a flow division pipe (57); the flow division pipe (57) is communicated with the leg abutting nozzle (6) through a third hose (58); a middle part of the flow division pipe (57) is fixedly connected with a discharge pipe (59); and an end socket of the discharge pipe (59) is provided with a control valve (591) and a drying box (592).

6. Medical protective clothing, which is inflated and discharges sweat using the disinfection equipment according to claim 1, the medical protective clothing comprising a closed hood body (7), wherein the head, the hands and the legs of the hood body are respectively fixedly connected with an abutting pipe (8); each abutting pipe (8) comprises a reference pipe (81); vent holes (82) are formed in two sides of the reference pipe (81); the reference pipe (81) is fixedly connected with the hood body (7); the reference pipe (81) is internally slidably connected with a communicating pipe (83); a lower end of the communicating pipe (83) is of a closed structure, and two sides are provided with abutting holes (84); the lower end of the communicating pipe (83) and a bottom of the reference pipe (81) are fixedly connected with reset springs (85); and the abutting holes (84) are aligned with the vent holes (82).

* * * * *